Figure 1:
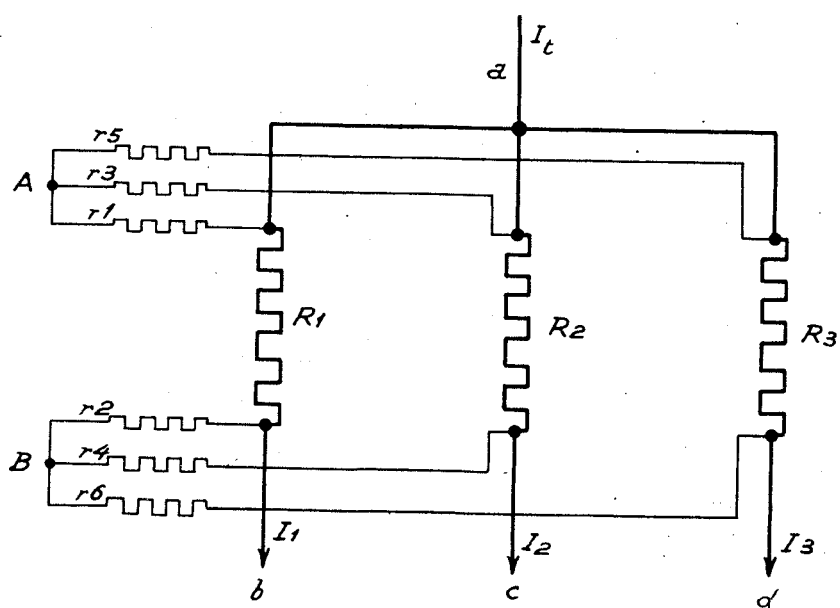

Aug. 12, 1952  R. J. PERRET-BIT  2,606,869
ELECTROLYTIC CELL

Filed June 25, 1948  2 SHEETS—SHEET 1

Inventor:
R. J. Perret-Bit
By E. F. Wenderoth
Atty

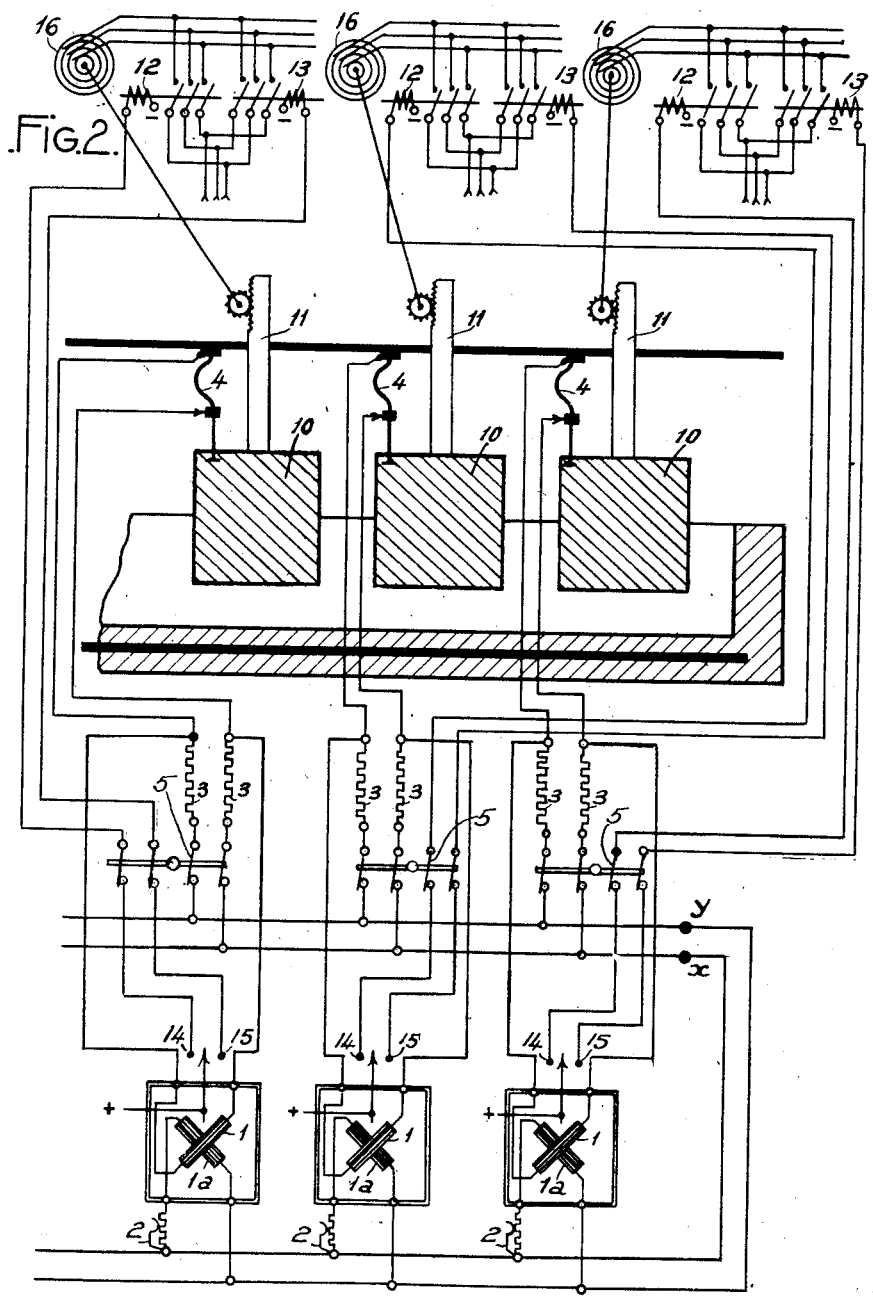

Patented Aug. 12, 1952

2,606,869

UNITED STATES PATENT OFFICE 2,606,869

ELECTROLYTIC CELL

Roger Joseph Perret-Bit, Chambery, France, assignor to Pechiney-Compagnie de Produits Chimiques et Electrometallurgiques Application June 25, 1948, Serial No. 35,264
In France July 21, 1947

2 Claims. (Cl. 204—225)

This invention relates to the adjustment or regulation of the current distribution between the various electrodes of an electrolysis system, and in particular for the manufacture of aluminum.

The characteristic features and advantages of the invention, will clearly appear from the ensuing description made in reference with the accompanying drawings, given by way of illustration and not of limitation and wherein:

Fig. 1 is an explanatory circuit diagram illustrating the general method used in my invention, while Fig. 2 diagrammatically shows one practical embodiment of the electrolysis system according to the invention, Referring to Fig. 1 of the drawings, there is shown a circuit $a$ connecting with three branch circuits $b$, $c$ and $d$. Let $I_t$ be the current through the circuit $a$ and $I_1$, $I_2$ and $I_3$ the respective currents through each of the three branch circuits $b$, $c$ and $d$ then $$I_t = I_1 + I_2 + I_3$$

In each of the branch circuits assuming the interposal of shunts or portions of conductors having resistances respectively equal to $R_1$, $R_2$ and $R_3$, I provide means for obtaining across a pair of points A and B a potential difference proportional to the total current value $I_t = I_1 + I_2 + I_3$.

For that purpose I connect the points A and B with the ends of the shunts or conductor portions in the manner shown in Fig. 1 through leads each having a resistance value $r_1 \ldots r_6$ such that $$r_1 + r_2 = KR_1$$
$$r_3 + r_4 = KR_2$$
$$r_5 + r_6 = KR_3$$

In particular assuming $R_1 = R_2 = R_3$, then $$r_1 + r_2 = r_3 + r_4 = r_5 + r_6$$

It can readily be shown that under such conditions the potential difference $V_a - V_b$ is proportional to the current $I_t$ providing however that the instrument with which the measurement is effected has an internal resistance which is very high as compared with the resistance $r_1 + r_2$ of the leads.

Such a method is used in connection with the adjustment or regulation system of the current distribution according to the invention between the various electrodes of an electrolysis cell.

On the other hand, it has been proposed to obtain a permanent measurement or indication of the ratio between the current flowing through any one electrode and the total current flowing through the cell. Thus it is possible to measure at any time and for any cell the ratio $$K = \frac{i}{\dfrac{I}{n}}$$

wherein $i$ = the current flowing through the electrode under consideration
$I$ = the total current through the cell, and
$n$ = the number of electrodes in the cell.

The instrument used will thus yield a direct indication of the ratio between the current actually flowing through the electrode under consideration and the current value $$\frac{I}{n}$$

which should normally flow through it.

The above-described method which may be used to provide a simple indication of any deviations in adjustment, or alternatively may serve to provide automatic regulation, is applicable only where the number of electrodes $n$ always remains the same. Should however said number of electrodes be subject to change during operation, it will be necessary at each time to modify the point of adjustment of the devices, at least in the event of automatic operation. Similarly it is necessary to effect such alteration in the adjustment setting whenever a worn electrode has just been replaced, because the cool electrode newly inserted requires an hour or two before it reaches its normal current value.

Thus it may be said that the invention consists of measuring the ratio between the current actually flowing through any one electrode under consideration and the mean value of the current through all of the electrodes being supervised, with the purpose of either merely signalling any deviation from the adjusted setting, or for providing automatic regulation.

In Fig. 2 of the appended drawings there is shown diagrammatically and merely for purposes of illustration an embodiment of a device according to my invention.

In said Figure 2 of the present drawings, $1-1a$ represents a crossed-coil contact instrument of the ratiometer type. As described therein, one of the coils $1$ remains supplied under the potential difference derived across the terminals of a shunt or conductor portion $4$ inserted in the circuit of the electrode $10$ under consideration. The other coil $1a$ is connected with a general common line supplying all of the similar coils of all the other instruments through a variable resistance 2 enabling adjustment of the constant K of the instrument at any desired value. Said common line is in turn supplied from a potential difference $xy$ which in the exemplary arrangement shown is obtained by connecting two resistors 3 with the terminals of the shunts or conductor portions 4 inserted in the circuit of each electrode and said resistors 3 should all be equal to each other both as to ohmic value and thermal factor.

Under such conditions, it may readily be proved that providing the input resistance of the coils is very high as compared to the resistors 3, the potential difference $xy$ obtained is $$U = \frac{R}{m}(I_1 + \ldots I_m)$$

wherein: R is the value of the resistance of the shunt or conductor portion 4, $m$ is the number of electrodes through which the current flow is to be supervised, that is all of the electrodes for which the switch 5 is closed; and $I_1, I_2 \ldots I_m$ are the respective currents through each of the electrodes being supervised. It will be noted that $m$ may be equal to or less than the number $n$ of electrodes in the cell.

Under such conditions one of the coils 1 of the instruments 1 is subjected to a potential difference $U_1 = RI_1$ for the electrode 10 while the other coil 1a has applied thereto a potential difference $$U = \frac{R}{m}(I_1 + \ldots I_m)$$

and this yields the desired result.

The switches 5 make it possible to isolate at will the resistance from any electrode which it may be desired not to include in the adjusting operation.

The regulating apparatus thus equipped may be used either simply for signalling any deviations in the adjustment, by means of two circuits supplying the signalling systems, said circuits being connected with the contacts 14 and 15, or else for an automatic regulation of the interpolar spacing.

In the latter event each electrode 10 is provided with a jack or elevating device 11 operated from a motor 16 the direction of operation of which is reversible at will through the contact devices 12 and 13. The coils of said contact devices are respectively energized through the contacts 14 and 15 of the regulators. In this way the electrodes 10 will be caused to move up or down as the case may be depending on whether the current distribution through said electrode is too high or too low with respect to the selected setting.

It will of course be understood that the invention is not restricted to the devices specifically described and shown herein but only as defined in the ensuing claims.

What I claim is:

1. In an electrolysis system comprising a fixed electrode of one polarity, a plurality of axially-adjustable electrodes of the opposite polarity individually adjustable towards and away from said fixed electrode, reversible motor means operating such adjustment, and a supply circuit supplying a plurality of said adjustable electrodes in parallel, a current distribution regulator system which comprises: equiresistant conductor portions interposed in series with each adjustable electrode, a ratiometer for each adjustable electrode having two windings, one winding connected across the related one of said conductor portions, a first and a second common conductor wire, first resistors each connecting one end of the conductor portion of one adjustable electrode to said first common conductor wire and second resistors each connecting the other end of said coductor portion of said electrode to said second common conductor wire, the sum of said first and said second resistor being the same in each pair, the other windings of all said ratiometers connected in parallel across said common conductor wires, and relay means connected with each ratiometer and the related motor for causing a deviation of said ratiometer to start said motor to adjust the related electrode in the direction tending to suppress said deviation.

2. In the electrolysis system of claim 1, a double break switch interposed between the conductor portions of each adjustable electrode and said common conductor wires for cutting off from said common conductor wires the conductor portion of any relay momentarily cut off from said supply.

ROGER JOSEPH PERRET-BIT.

REFERENCES CITED

The following references are of record in the file of this patent:

UNITED STATES PATENTS

| Number | Name | Date |
|--------|------|------|
| 851,149 | Woodbridge et al. | Apr. 23, 1907 |
| 1,396,919 | Brace | Nov. 15, 1921 |
| 1,617,145 | Brown | Feb. 8, 1927 |
| 1,901,344 | Horton | Mar. 14, 1933 |
| 2,061,146 | Ferrand | Nov. 17, 1936 |
| 2,463,254 | Edwards et al. | Mar. 1, 1949 |